J. NIELSEN.
CORN HARROW.
APPLICATION FILED JULY 13, 1914.
1,182,304. Patented May 9, 1916.
2 SHEETS—SHEET 1.
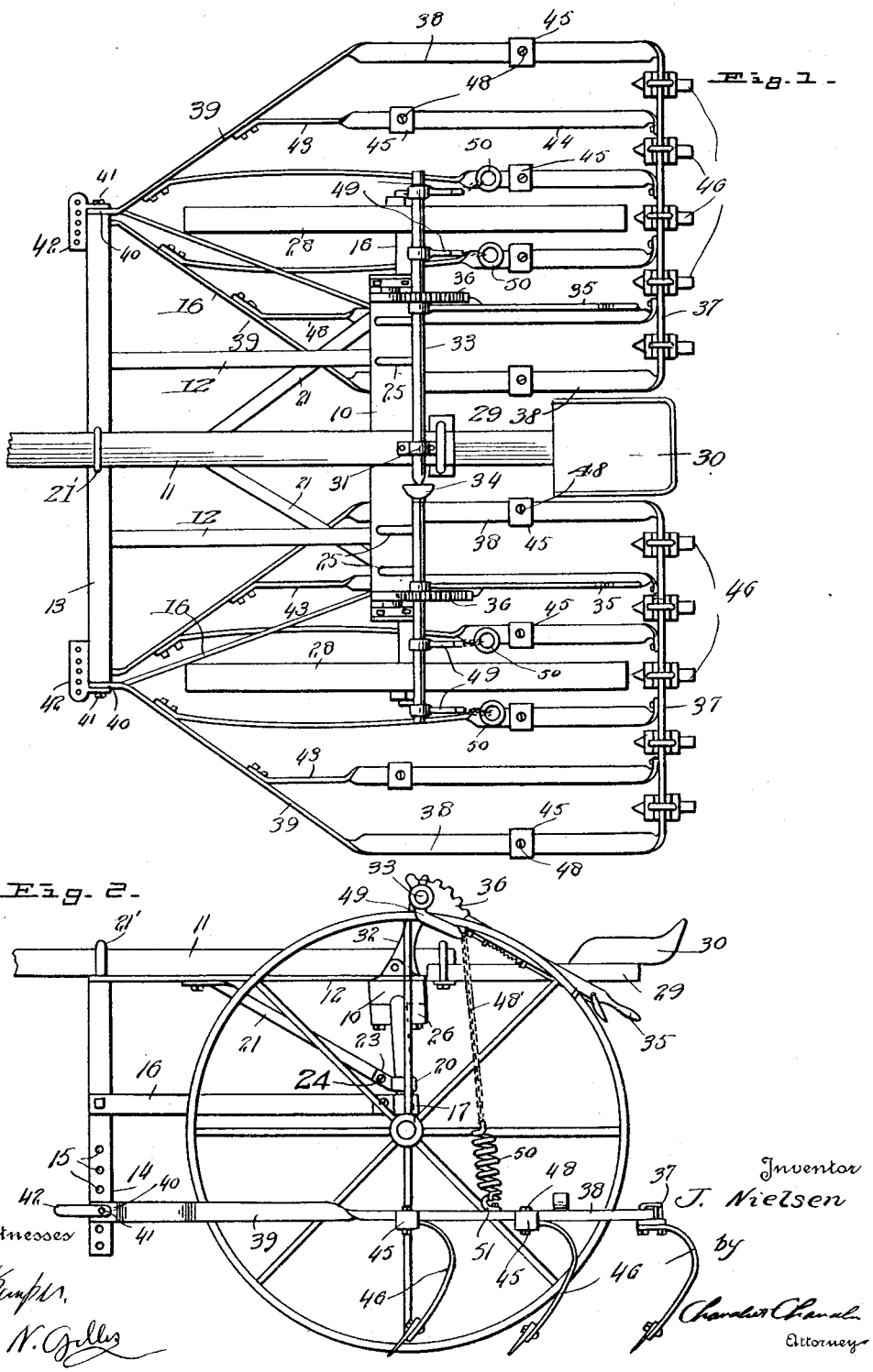

J. NIELSEN.
CORN HARROW.
APPLICATION FILED JULY 13, 1914.
1,182,304.
Patented May 9, 1916.
2 SHEETS—SHEET 2.
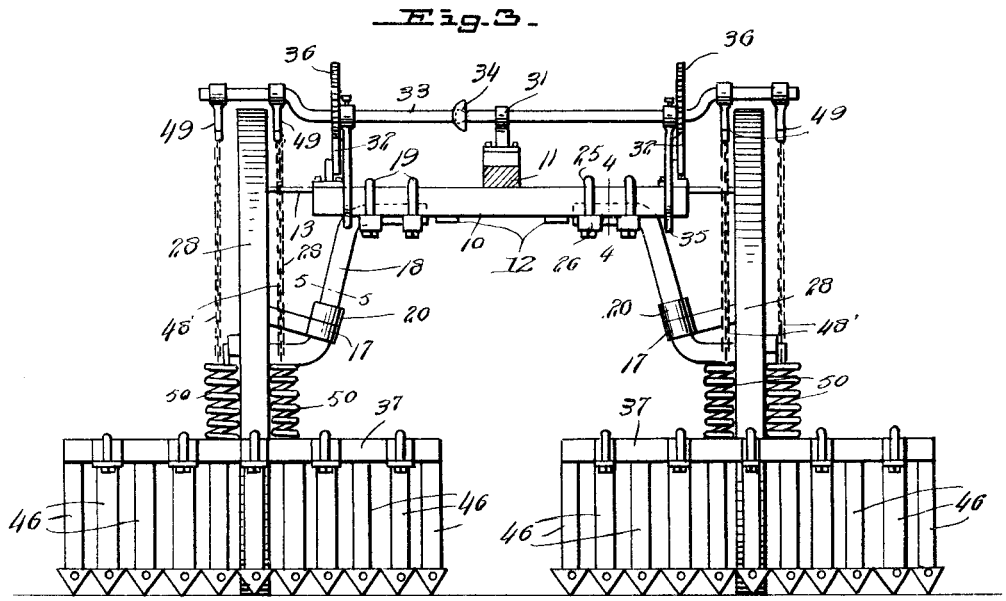
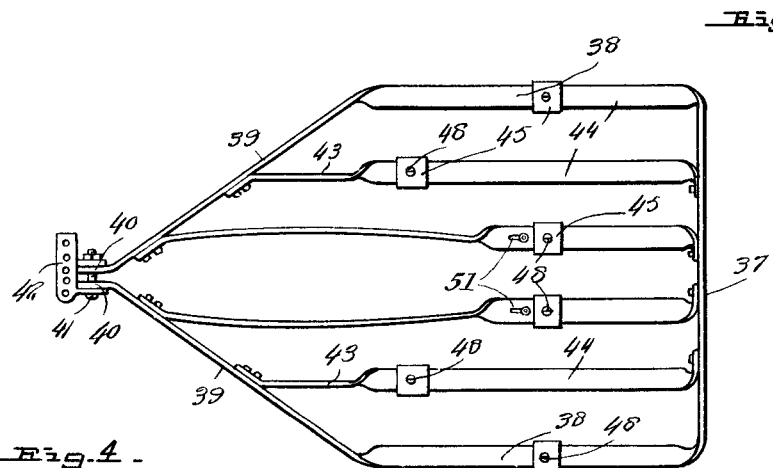
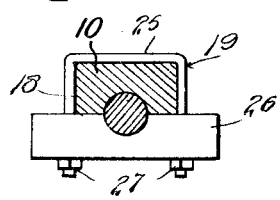
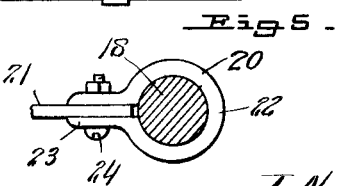
Inventor
J. Nielsen.
Witnesses
By
Attorneys

UNITED STATES PATENT OFFICE.

JOHANNES NIELSEN, OF CHATSWORTH, IOWA.

CORN-HARROW.

1,182,304.  Specification of Letters Patent.  Patented May 9, 1916.

Application filed July 13, 1914. Serial No. 850,821.

*To all whom it may concern:*

Be it known that I, JOHANNES NIELSEN, a citizen of the United States, residing at Chatsworth, in the county of Sioux, State of Iowa, have invented certain new and useful Improvements in Corn-Harrows; and I do hereby declare the following to be a full, clear, and exact description of the invention, such as will enable others skilled in the art to which it appertains to make and use the same.

This invention relates to agricultural implements and has special reference to a corn harrow of the two row type.

The principal object of the invention is to improve and simplify the general construction of devices of this character.

A further object of the invention is to provide an improved form of frame for carrying the harrow teeth.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and:—Figure 1 is a plan view of a harrow constructed in accordance with this invention. Fig. 2 is a side elevation thereof. Fig. 3 is a rear view thereof. Fig. 4 is a detail section on the line 4—4 of Fig. 3. Fig. 5 is a detail section on the line 5—5 of Fig. 3. Fig. 6 is a detail plan view of the improved tooth supporting frame.

In carrying out the objects of this invention there is provided a main cross bar 10 and secured to this main cross bar is a tongue 11. Extending forwardly from the main cross bar are main frame members 12 which are connected by a cross bar 13 at the forward end and this cross bar 13 has its ends bent down as at 14 and provided with a series of openings 15. Furthermore braces 16 run from these downward ends to clips 17 secured to Z-shaped stub axle 18, the upper end of the latter being secured to the cross bar 10 by means of suitable clips 19 so arranged that these stub axles 18 may be swung forward or back from the perpendicular as desired. Furthermore other clips 20 serve to secure diagonal braces 21 which pass from the substantially vertical branch of the stub axle 18 to the member 12 on each side of the machine. It will be obvious that the tongue or shaft 11 is also secured to the cross member 13 as indicated by the clip 21'. Each of these clips 17 and 20 comprises an arcuate central portion 22 which terminates at each end in a substantially parallel jaw 23 between which the brace ends are secured by means of a bolt 24. Each of the members 19 consists of a U-shaped clip 25 connected by a cross bar 26, the arms of the U-shaped clip being threaded and carrying nuts 27 thus forming the usual U-clips. On each of the stub axles 18 is mounted a ground wheel 28 of the ordinary type and extending rearwardly from the tongue or pole 11 is a support 29 carrying a driver's seat 30.

Journaled in a central bearing 31 and in side bearings 32 in the form of quadrants is a crank axle 33 which is formed in two independent sections connected together by a swivel joint as at 34, this structure enabling either end of the crank axle to be turned independently and secured at each end of the crank axle is a latch lever 35 which coöperates with the respective quadrant 36 of the bearing 32 at that end.

The tooth supporting frame consists of flat bar metal. This bar metal frame comprises an outside member the metal being arranged vertically, that is to say with its longest cross sectional dimension vertical at the rear end as indicated at 37. The metal is then twisted to form flat side pieces 38 and again twisted at the forward end to form vertical end pieces 39 which terminate forwardly in parallel portions 40 lying on opposite sides of the respective members 14 and being held in position therein by means of a suitable bolt 41 which also serves to carry a clevis 42 for the attachment of the draft animal on that side of the device. Between the members 38 and reaching from the member 37 to the member 39 are certain flat bars of metal each of which has its ends turned down vertically as indicated at 43 and its central portion turned flat or horizontally as indicated at 44. Slidably mounted on these flat portions 38 and 44 are clips 45 which serve to secure the spring harrow teeth 46, the clips being adjustable longitudinally of the respective bars and being held in desired position by means of suitable set screws 48.

It is to be noted that the bolt 41 may be inserted in any of the holes 15 so that the forward end of this frame may be raised or lowered as desired. Connected to each of the crank sections 33 is a respective harrow frame supported by a pair of resilient hangers. These resilient hangers consist of chains 48' which are connected at their upper ends to clips 49 secured to the cranks of the crank shafts 33 and are connected at their lower end to springs 50 which have their lower ends in turn connected to the central members of the entire tooth frame as indicated at 51. It is to be understood that these frames are sufficiently wide to occupy the space between two rows of corn and are sufficiently separated to permit a row of corn passing between them.

From the foregoing it will be readily seen that by properly positioning the forward end of the entire tooth frame the rear end may be raised or lowered as desired and will yield at contact with any obstruction thus preventing injury to the teeth. It will also be seen that by shifting the stub axles forward or back the height of the draft pole may be regulated as well as the position of the harrow teeth with respect to the member 10 and driver's seat. There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

In a device of the kind described, a tooth carrying frame comprising an outer member made of flat bar metal having a rear portion with the bar arranged vertically, side portions with the bar arranged horizontally, and converging forward portions terminating in parallel extremities, said converging and parallel portions having the bar arranged vertically; in combination with the longitudinally integral members formed of similar bar metal and each having its central portion with the bar arranged horizontally and its terminal portions with the bar arranged vertically and connected respectively to the vertical portions of the outer frame.

In testimony whereof, I affix my signature, in the presence of two witnesses.

JOHANNES NIELSEN.

Witnesses:
J. L. GAMBLE,
H. B. DALGLIESH.